United States Patent
Virtej et al.

(10) Patent No.: US 11,432,223 B2
(45) Date of Patent: Aug. 30, 2022

(54) METHODS AND APPARATUSES FOR SELECTING A FIRST BASE STATION OR A SECOND BASE STATION TO TRANSMIT A PACKET DATA UNIT (PDU) TO A USER EQUIPMENT (UE)

(71) Applicant: Nokia Solutions and Networks Oy, Espoo (FI)

(72) Inventors: Elena Virtej, Espoo (FI); Eugen Wallmeier, Eichenau (DE); Piotr Lechowicz, Wroclaw (PL); Jari Petteri Lunden, Espoo (FI); Esa Mikael Malkamaki, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/742,773

(22) PCT Filed: Jul. 7, 2016

(86) PCT No.: PCT/EP2016/066128
§ 371 (c)(1),
(2) Date: Jan. 8, 2018

(87) PCT Pub. No.: WO2017/005854
PCT Pub. Date: Jan. 12, 2017

(65) Prior Publication Data
US 2018/0206173 A1    Jul. 19, 2018

Related U.S. Application Data
(60) Provisional application No. 62/190,006, filed on Jul. 8, 2015.

(51) Int. Cl.
*H04W 40/02* (2009.01)
*H04L 45/121* (2022.01)
(Continued)

(52) U.S. Cl.
CPC .......... *H04W 40/02* (2013.01); *H04L 45/121* (2013.01); *H04L 5/001* (2013.01); *H04W 84/045* (2013.01)

(58) Field of Classification Search
CPC .............................. H04W 40/00; H04L 45/00
See application file for complete search history.

(56) References Cited

U.S. PATENT DOCUMENTS

| | | | |
|---|---|---|---|
| 7,237,036 B2 * | 6/2007 | Boucher ................. | H04L 69/12 709/236 |
| 2009/0185492 A1 * | 7/2009 | Senarath ............... | H04L 45/122 370/238 |

(Continued)

FOREIGN PATENT DOCUMENTS

| | | |
|---|---|---|
| CN | 103747442 A | 4/2014 |
| EP | 1699178 A1 | 9/2006 |

(Continued)

OTHER PUBLICATIONS

Huawei, "Flow Control for Split Bearers" (Title), 3GPP TSG RAN WG3 Meeting #83bis, Mexico, R3-140560, Mar. 31-Apr. 4, 2014. (Year: 2014).*

(Continued)

*Primary Examiner* — Jung H Park
*Assistant Examiner* — Sumitra Ganguly
(74) *Attorney, Agent, or Firm* — Harrington & Smith (57) ABSTRACT

A method includes determining an estimate of a data packet path time from a first base station 13 to a user equipment (UE), and determining, based at least partially upon a communication received from a second base station 15, an estimate of a data packet path time from the first base station 13 via the second base station 15 to the user equipment (UE) 10. The method includes, based at least partially upon the determined estimates, selecting either the first base station (Continued)

13 or the second base station 15 to transmit a packet data unit (DPU) (PDU) to the user equipment (UE) 10.

20 Claims, 6 Drawing Sheets

(51) Int. Cl.
*H04L 5/00* (2006.01)
*H04W 84/04* (2009.01)

(56) References Cited

U.S. PATENT DOCUMENTS

| | | | | |
|---|---|---|---|---|
| 2009/0227258 A1* | 9/2009 | Youn | ............... | H04W 72/0406 |
| | | | | 455/445 |
| 2011/0053585 A1* | 3/2011 | Otonari | ............... | H04L 1/0073 |
| | | | | 455/422.1 |
| 2015/0350054 A1* | 12/2015 | Stokking | ............... | H04L 43/10 |
| | | | | 370/253 |
| 2016/0212790 A1* | 7/2016 | Fujishiro | ............... | H04W 76/16 |
| 2016/0309375 A1 | 10/2016 | Dai et al. | | |

FOREIGN PATENT DOCUMENTS

| | | | | |
|---|---|---|---|---|
| EP | 2291053 | A1 | 3/2011 | |
| EP | 2830352 | A1 * | 1/2015 | ............ H04L 47/32 |
| EP | 3320750 | | 5/2018 | |
| GB | 2520923 | B | 12/2013 | |
| GB | 201319312 | | 12/2013 | |
| JP | 2006229972 | A | 8/2006 | |
| JP | 2011055194 | A | 3/2011 | |
| WO | WO 2015/098951 | A1 | 7/2015 | |

OTHER PUBLICATIONS

Huawei et al. "*Indication Options of PDCP PDU Delivery Success*" 3GPP TSG-RAN WG2 Meeting #86 Seoul, Korea, May 19-May 23, 2014 R2-142083.

Nokia Networks et al. "*UE Throughput History Information*" 3GPP TSG-RAN WG3 Meeting #87bis Santa Cruz, Tenerife, Spain, Apr. 20-24, 2015, R3-150527.

3GPP TSG RAN WG3 Meeting #83bis, San Jose del Cabo, Mexico, Mar. 30, 2014, R3-140560, "Flow Control for Split Bearers", Mobile Competence Centre, 4 pgs.

3GPP TSG-RAN WG2 Meeting #85bis, Valencia, Spain, Mar. 22, 2014, R2-141290, "Support of PDCP Reordering and Flow Control for a DL Split Bearer", Mobile Competence Centre, 3 pgs.

3GPP TR 36.875 V2.0.0, France, Jun. 15, 2015, RP-150939, "3rd Generation Partnership Project; Technical Specification Group Radio Access Network; Evolved Universal Terrestrial Radio Access Network (E-UTRAN); Extension of Dual Connectivity in EUTRAN (Release 13)", Mobile Competence Centre, 38 pgs.

3GPP TS 36.300 V12.5.0, Mar. 2015, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12)", 251 pgs.

3GPP TS 36.425 V12.1.0, Mar. 2015, "3rd Generation Partnership Project; Technical Specification Group Radio Access Network; Evolved Universal Terrestrial Radio Access (E-UTRA) and Evolved Universal Terrestrial Radio Access Network (E-UTRAN); X2 Interface User Plane Protocol (Release 12)", 15 pgs.

3GPP TR 36.875 V13.1.0; "3$^{rd}$ Generation Partnership Project; Technical Specification Group Radio Access Network; Evolved Universal Terrestrial Radio Access Network (E-UTRAN); Extension of dual connectivity in E-UTRAN (Release 13)"; Sep. 2015; whole document (34 pages).

* cited by examiner

MeNB side:
1. DQ_SeNB=0 (No requests => no data sent => delay estimated by MeNB for SeNB data is 0)
2. Request from SeNB received by MeNB
   MeNB info available {SeNB throughput estimate, data request}
   DQ_SeNB (estimated by MeNB)=
   T_buffering - data_request/ SeNB_throughput_estimate 3. MeNB estimates the delay

METHODS AND APPARATUSES FOR SELECTING A FIRST BASE STATION OR A SECOND BASE STATION TO TRANSMIT A PACKET DATA UNIT (PDU) TO A USER EQUIPMENT (UE)

BACKGROUND

Technical Field

The exemplary and non-limiting embodiments relate generally to radio communications and, more particularly, to splitting a data stream into sub-streams.

Brief Description of Prior Developments

In data networks, packets of a data stream may reach their destination via multiple paths. A Dual Connectivity operation mode is introduced in 3GPP release 12. A routing function at a "splitting point" has to decide which packets shall take which path. E-UTRAN supporting Dual Connectivity (DC) operation provides an example of such a network: A multiple RX/TX UE in RRC_CONNECTED may be configured to utilize radio resources provided by two distinct schedulers, located in two eNBs connected via a non-ideal backhaul over the X2 interface.

SUMMARY

The following summary is merely intended to be exemplary. The summary is not intended to limit the scope of the claims.

In accordance with one aspect, an example method comprises determining an estimate of a data packet path time from a first base station to a user equipment (UE); determining, based at least partially upon a communication received from a second base station, an estimate of a data packet path time from the first base station via the second base station to the user equipment (UE); and based at least partially upon the determined estimates, selecting either the first base station or the second base station to transmit a packet data unit (DPU) (PDU) to the user equipment (UE).

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

In accordance with another aspect, an example apparatus comprises at least one processor; and at least one non-transitory memory including computer program code, the at least one memory and the computer program code configured to, with the at least one processor, cause the apparatus to: determine an estimate of a data packet path time from a first base station to a user equipment (UE); determine, based at least partially upon a communication received from a second base station, an estimate of a data packet path time from the first base station via the second base station to the user equipment (UE); and based at least partially upon the determined estimates, select either the first base station or the second base station to transmit a packet data unit (PDU) to the user equipment (UE).

In accordance with another aspect, an example embodiment is provided in a non-transitory program storage device readable by a machine, tangibly embodying a program of instructions executable by the machine for performing operations, the operations comprising: determining an estimate of a data packet path time from a first base station to a user equipment (UE); determining, based at least partially upon a communication received from a second base station, an estimate of a data packet path time from the first base station via the second base station to the user equipment (UE); and based at least partially upon the determined estimates, selecting either the first base station or the second base station to transmit a packet data unit (PDU) to the user equipment (UE).

In accordance with another aspect, an example apparatus comprises means for determining an estimate of a data packet path time from a first base station to a user equipment (UE); means for determining, based at least partially upon a communication received from a second base station, an estimate of a data packet path time from the first base station via the second base station to the user equipment (UE); and means for selecting, based at least partially upon the determined estimates, either the first base station or the second base station to transmit a packet data unit (PDU) to the user equipment (UE).

In accordance with another aspect, an example method comprises determining information by a second base station comprising at least one of: a number of packet data units (PDUs) received by the second base station from a first base station which have been sent by the second base station to a user equipment (UE), a queuing delay in the second base station in transmitting the packet data units (PDUs) received by the second base station from the first base station to the user equipment (UE), and an estimate of throughput by the second base station in transmitting the packet data units (PDUs) received by the second base station from the first base station to the user equipment (UE); and transmitting the information by the second base station to the first base station.

In accordance with another aspect, an example apparatus comprises at least one processor; and at least one non-transitory memory including computer program code, the at least one memory and the computer program code configured to, with the at least one processor, cause the apparatus to: determine information by the apparatus, where the apparatus comprises a second base station, comprising at least one of: a number of packet data units (PDUs) received by the second base station from a first base station which have been sent by the second base station to a user equipment (UE), a queuing delay in the second base station in transmitting the packet data units (PDUs) received by the second base station from the first base station to the user equipment (UE), and an estimate of throughput by the second base station in transmitting the packet data units (PDUs) received by the second base station from the first base station to the user equipment (UE); and transmit the information by the second base station to the first base station.

In accordance with another aspect, an example embodiment is provided in a non-transitory program storage device readable by a machine, tangibly embodying a program of instructions executable by the machine for performing operations, the operations comprising: determining information by a second base station comprising at least one of: a number of packet data units (PDUs) received by the second base station from a first base station which have been sent by the second base station to a user equipment (UE), a queuing delay in the second base station in transmitting the packet data units (PDUs) received by the second base station from the first base station to the user equipment (UE), and an estimate of throughput by the second base station in transmitting the packet data units (PDUs) received by the second base station from the first base station to the user equipment (UE); and transmitting the information by the second base station to the first base station.

In accordance with another aspect, an example apparatus comprises means for determining information by a second base station comprising at least one of: a number of packet data units (PDUs) received by the second base station from a first base station which have been sent by the second base station to a user equipment (UE), a queuing delay in the second base station in transmitting the packet data units (PDUs) received by the second base station from the first base station to the user equipment (UE), and an estimate of throughput by the second base station in transmitting the packet data units (PDUs) received by the second base station from the first base station to the user equipment (UE); and means for transmitting the information by the second base station to the first base station.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

The following abbreviations that may be found in the specification and/or the drawing figures are defined as follows:

3GPP Third Generation Partnership Program
AP Access Point
BB Baseband
CC Component Carrier
CCA Clear Channel Assignment
CRC Cyclic Redundancy Check
CRS Cell Specific Reference Signal
CRW Channel Reservation Window
CSI Channel State Information
CSI-RS Channel State Information Reference Signal
CSS Common Search Space
DCI Downlink Control Information
DL Downlink
DMRS Demodulation Reference Signal
DRB Data Radio Bearer
DS Discovery Signal
DTX Discontinuous Transmission
DwPTS Downlink Pilot Time Slot
e.i.r.p. equivalent isotropically radiated power
eIMTA Enhanced Interference Mitigation and Traffic Adaptation (the name of the 3GPP WI targeting to flexible UL/DL adaptation for TD-LTE)
eNB/eNodeB enhanced Node B (base station according to LTE terminology)
EPC Enhanced Packet Core
EPDCCH Enhanced PDCCH
FDD Frequency Division Duplex
GP Guard Period
ID Identity
ISM Industrial, Scientific and Medical
LAA License-Assisted Access
LBT Listen Before Talk
LTE Long Term Evolution
MeNB Master eNB
NCT New Carrier Type
OFDM Orthogonal Frequency Division Multiplexing
OFDMA Orthogonal Frequency Division Multiple Access
PCell Primary Cell
PDCCH Physical Downlink Control CHannel
PDCP Packet Data Convergence Protocol
PDSCH Physical Downlink Shared CHannel
PDU Packet Data Unit, Protocol Data Unit
PLMN Public Land Mobile Network
PRB Physical Resource Block
PSS Primary Synchronization Signal
RAN Radio Access Network
Rel Release
RLC Radio Link Control
RNTI Radio Network Temporary Identifier
RRM Radio Resource Management
S-GW Serving Gateway
SCell Secondary Cell
SCS Short Control Signalling
SeNB Secondary eNB
SSS Secondary Synchronization Signal
SDL Supplemental DL
SDU Service Data Unit
TB Transport Block
TCP Transmission Control Protocol
TD/TDD Time Division duplex
TL Threshold Level
UE User Equipment
UL Uplink
UpPTS Uplink Pilot Time Slot
X2 X2 is an interface used to communication between eNBs The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for data stream splitting. Additional description of these techniques is presented after a system into which the exemplary embodiments may be used is described.

Figure 1:
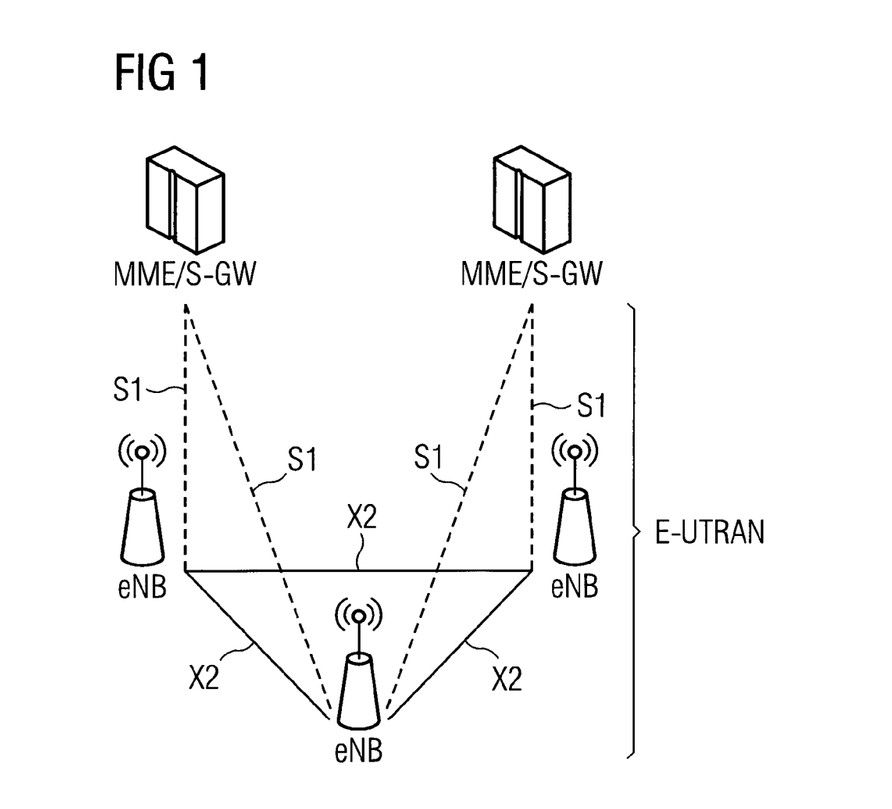
FIG. 1 is a diagram illustrating an example of an overall architecture of a E-UTRAN (evolved UMTS Terrestrial Radio Access) system (an air interface of 3GPP's Long Term Evolution (LTE) upgrade path for mobile networks)

FIG. 1 shows an example of overall architecture of an E-UTRAN system. The E-UTRAN system includes eNBs, providing an E-UTRAN user plane (PDCP/RLC/MAC/

PHY) and control plane (RRC) protocol terminations towards the UE (not shown in FIG. 1). The eNBs are interconnected with each other by means of an X2 interface. The eNBs are also connected by means of a S1 interface to an EPC (Enhanced Packet Core), more specifically to a MME (Mobility Management Entity) by means of a S1 MME interface and to a Serving Gateway (S-GW) by means of a S1 interface. The S1 interface supports a many-to-many relationship between MMEs/S-GW and eNBs.

Figure 2:
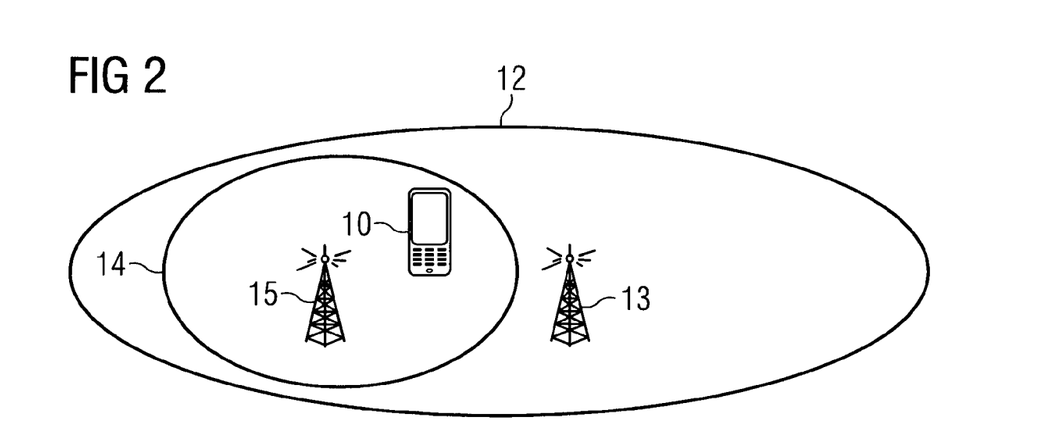
FIG. 2 is a diagram illustrating an example of a User Equipment (UE) in partially overlapping cells.

Referring also to FIG. 2, a UE 10 may be connected to more than one cell at a same time. In this example the UE 10 is connected to a first cell 12 having a base station 13 (such as an eNB for example) and a second cell 14 having a base station 15 (such as an eNB or WiFi Access Point for example). The two cells 12, 14 are, thus, at least partially overlapping. In one type of example embodiment, the first cell may operate on a licensed band and the second on may operate on an unlicensed band. For simplicity, there are just two cells depicted in the scenario shown in FIG. 2. In other alternate examples any number of cells operating on licensed and/or unlicensed band(s) may be provided to work together for a suitable Carrier Aggregation (CA).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In data networks, packets of a data stream may reach their destination via multiple paths. A routing function at a "splitting point" has to decide which packets shall take which path. Features as described herein may use a method which can be used by the splitting point in order to decide how the data stream shall be split. An algorithm may be provided which has the aim to ensure that a receiver at the destination can deliver "reordered data" as fast as possible to an application using the data. E-UTRAN supporting Dual Connectivity (DC) operation provides an example of such a network: A multiple RX/TX UE in RRC_CONNECTED is configured to utilize radio resources provided by two distinct schedulers, located in two eNBs connected via a non-ideal backhaul over the X2 interface (see 3GPP TR 36.300).

For the transport of user plane data from the S-GW to the UE so-called "split bearers" may be used. Split bearers provide two paths for downlink user plane data. They can either be sent from the S-GW via a "Master eNB (MeNB)" to the UE, or they can be sent from the S-GW via the MeNB to a Secondary eNB (SeNB) which finally sends them to the UE. For a "split bearer" the Master eNB (MeNB) is U-plane connected to the S-GW via S1-U and in addition, the MeNB is interconnected to a Secondary eNB (SeNB) via X2-U. This is illustrated by the example shown in FIG. 3.

Figure 3:
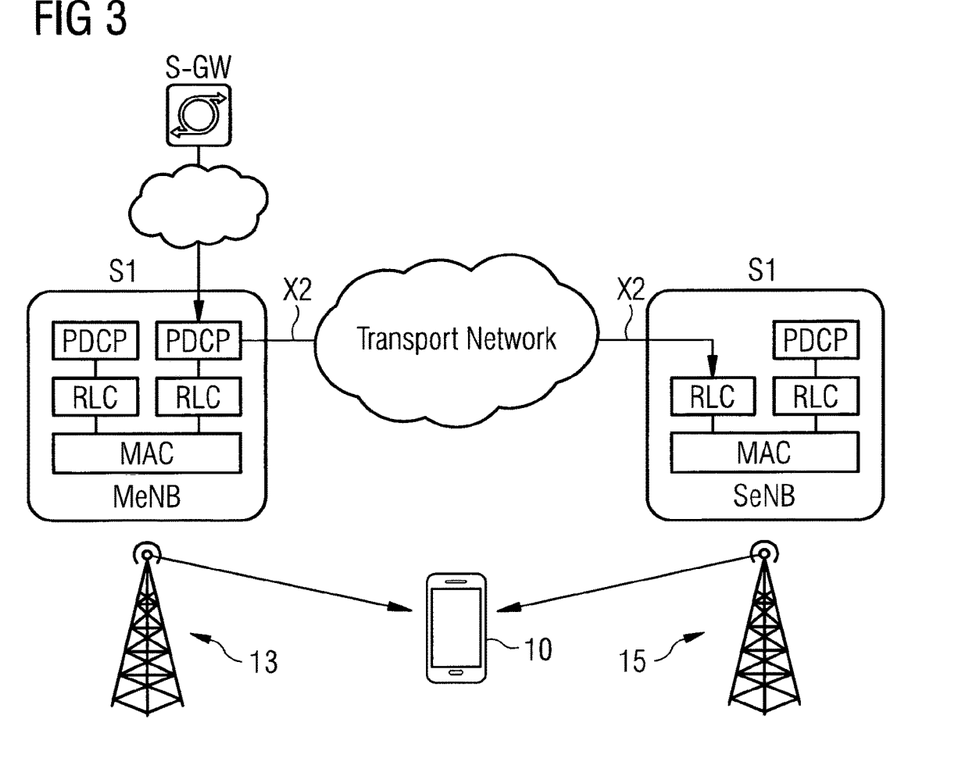
FIG. 3 is an example diagram illustrating downlink user data flow for a split Data Radio Bearer.

The routing function in the PDCP layer of the MeNB decides whether a PDCP layer PDU of a split bearer is sent directly over the local air interface to the UE or whether it is forwarded to the SeNB via X2-U. A PDCP layer reordering function in the UE receives PDUs from the MeNB and from the SeNB, reorders them and forwards them to the application running on the UE 10. The features described herein may be used for splitting the data stream in such a way that PDUs sent via the two different paths experience the same or similar delay between the splitting point in the MeNB and the reordering function in the PDCP layer of the UE. Such a split i. minimizes reordering delays in the UE and the Round Trip Time for TCP ii. optimizes the usage of the available bandwidth on both paths.

The algorithm ensures that problems for TCP applications as described below cannot happen.

The PDCP layer in the MeNB stores DL SDUs of a split bearer in a bearer specific FIFO queue. When the PDCP layer processes an SDU (ciphering, adding a PDCP sequence number, . . . ), it checks (using the algorithm of the invention) whether the direct path to the UE via the local air interface or whether the path via the air interface of the SeNB is faster. It forwards the PDU via the fastest path (see FIG. 4). The routing function in the PDCP layer of the MeNB may select, for each PDCP PDU, the fastest path from both of the available paths. This equalizes the delays via both paths, minimizes reordering delay in the UE and RTT seen by TCP. This principle can be applied not only for TCP traffic but in general. This principle does not put any specific constraints to the schedulers. QoS or fairness topics can be handled independently.

Routing of PDCP PDUs towards SeNB RLC or MeNB RLC may be done as late as possible. TRS (scheduler) and RLC queues may be kept short in order to avoid a) that packets are discarded after adding PDCP sequence numbers (after such packet discards, reordering function in UE will stop until reordering timer expires) b) that a lot of data is stuck in RLC, when the air interface throughput suddenly drops, e.g. since a UE with higher scheduling weight gets active, c) that the information that a packet has been discarded by Active Queue Management (AQM) reaches the TCP source only after a long delay (AQM should discard packets only from the SDU queue, not from the RLC queues).

Routing of PDCP PDUs towards SeNB RLC or MeNB RLC may be done early enough in order to avoid that the RLC queue of the SeNB runs empty, although the path via SeNB is faster than via MeNB and data are waiting in the SDU queue.

For the example using a Little's Law algorithm noted below, it may not be recommended that the SeNB requests packets, in order to avoid that the RLC queue runs empty. This might introduce queuing which can be avoided. For the example using SeNB feedback noted below may not use this recommendation.

The time needed to reach the UE via a given path depends on the latency of the path and the amount of queuing along the path. Queuing occurs if the arrival rate of the traffic offered to a path exceeds its capacity. The capacity of the two paths may vary quickly. For example, the capacity of the two paths may vary quickly depending on the radio conditions and the load on the air interface. The capacity of the path via the SeNB may be limited by the bandwidth available at the air interface, but it can also be limited by a bottleneck elsewhere, e. g by a bottleneck in the transport network.

The features are described below in regard to two example alternative embodiments; how to decide, whether the path to the UE via the local air interface or via the SeNB is faster. The basic principle in both of the embodiments is the same: For each (PDCP) PDU determine which of the alternative paths (transmit locally or via SeNB) is estimated to be faster. If the estimated delay of the faster path is below a target delay (e.g. 50 ms), the PDU is sent via that path, otherwise it remains still at PDCP (in MeNB). After each decision and subsequent sending of the PDU, the delay estimate of the corresponding path is updated taking account the sent PDU before making the decision for the next PDU.

Algorithm Using Little's Law

This example embodiment uses an algorithm based on Little's law in order to estimate, how long a packet needs to travel from the splitting function in the MeNB to the reordering function in the UE. According to Little's law the mean sojourn time W of a packet in an arbitrary stable queuing system can be calculated as $$W=L/TH \qquad (1)$$

where L is the mean number of packets in the system and TH is the mean departure rate or, in other words, the mean throughput of the system.

Decision Criterion

Figure 4:
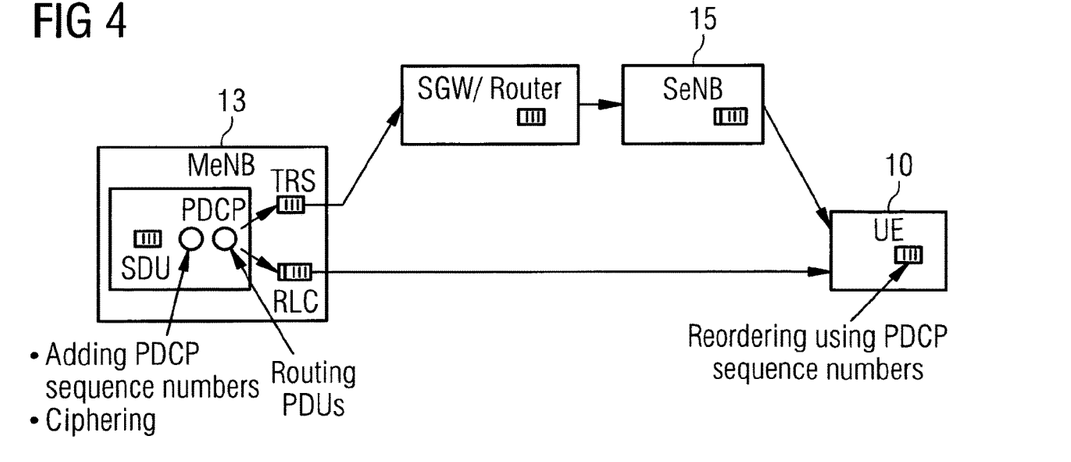
FIG. 4 is an example diagram illustrating downlink user data flow for a split Data Radio Bearer between MeNB and UE.

The MeNB has to decide for each PDCP layer PDU which of the two paths shown in FIG. 4 shall be used. The MeNB may use the following information for calculating the sojourn times of packets using one of the two paths shown in FIG. 4:

1) The SeNB sends messages ("acknowledgement (ack) messages") to the MeNB which indicate that PDUs have been sent to the UE (or, depending on the definition, that PDUs have been correctly received by the UE). There are several options how to exactly define what "sent to the UE" means. "Sent to the UE" can be defined as: The SW component of the SeNB creating ack messages is informed by the RLC layer that the PDU has been successfully delivered to the UE. Alternatively "Sent to the UE" can, for example, be defined as: The SW component of the SeNB creating ack messages is informed by the RLC that the RLC has transferred the PDU from RLC to MAC. Another alternative is messaging related to Downlink Data Delivery Status procedure: 3GPP TS 36.425 defines DL data delivery status messages for forwarding acks for PDUs from SeNB to MeNB, which includes the highest PDCP PDU sequence number successfully delivered in sequence to the UE among those PDCP PDUs received from the MeNB.

2) MeNB maintains a variable L_S ("data in flight"), which stores the number of bytes included in PDUs which have been routed to the SeNB, but which have not yet been acknowledged by the SeNB.

3) MeNB maintains a variable TH_S, which provides an estimation for the "expected throughput" of the path via SeNB in the near future. This means it is assumed that the PDUs currently queued will be served at TH_S. The MeNB can estimate TH_S by calculating the "recent throughput" from acknowledgements for PDUs contained in the ack messages sent by the SeNB. During the starting phase the "recent throughput" may be a poor estimation for the "expected throughput". Therefore it is recommended to estimate the "expected throughput" TH_S as max(Initial_throughput, recent throughput), where "Initial_throughput" is a predefined value. For example, the predefined value may be set to 1 Mb/s.

4) MeNB maintains a variable L_M ("data in flight"), which contains the number of bytes of PDUs in flight. A PDU is in flight, when the PDCP layer has taken the decision to send the PDU via the local air interface and is waiting for the information that the PDU has been sent to the UE (applying an analogous definition of "sent to UE" as in the SeNB).

5) MeNB maintains a variable TH_M which gives the "expected throughput" of the path via MeNB. TH_M is to be provided for example by the MAC scheduler.

Let $t_{M0}$ denote the time when the PDCP layer of the MeNB decides to route a PDU via the local air interface. Let $t_{M1}$ denote the time when the PDCP layer is informed that the PDU has been sent to the UE $$T\_MeNB=(L\_M+\text{PDU-size})/TH\_M \qquad (2)$$

is an estimate for the sojourn time $t_{M1}-t_{M0}$ for the PDU currently processed by the PDCP layer.

Let $t_{S0}$ denote the time when the PDCP layer of the MeNB decides to route a PDU via SeNB. Let $t_{S1}$ denote the time when the SW component of the SeNB creating ack messages is informed that the PDU has been sent to the UE, and let $t_{S2}$ denote the time when the PDCP layer in the MeNB receives the ack message confirming that the PDU has been sent to the UE.

$$(L\_S+\text{PDU-size})/TH\_S \qquad (3)$$

is an estimate for the sojourn time $t_{S2}-t_{S0}$ for the PDU currently processed by the PDCP layer. Let T_ack denote the time difference $t_{S2}-t_{S1}$. Then $$(L\_S+\text{PDU-size})/TH\_S-T\_\text{ack} \qquad (4)$$

is an estimate for $(t_{S2}-t_{S0})-(t_{S2}-t_{S1})=t_{S1}-t_{S0}$ for the PDU currently processed by the PDCP layer.

Let T_ack_avg denote the average of the values of T_ack. T_ack_avg includes the latency of the path from SeNB to MeNB, the mean delay between "sending a PDU to the UE" (as defined above) and sending out the ack message to the MeNB, and processing times in SeNB and MeNB. T_ack_avg may be calculated offline for a given pair of eNBs.

$$(L\_S+\text{PDU-size})/TH\_S-T\_\text{ack\_avg} \qquad (5)$$

gives an estimation of the time $t_{S1}-t_{S0}$ which can be calculated by the MeNB.

Comparing the values given by (2) and (5) the MeNB can decide which of the two paths is faster.

Simulations have shown that the estimate (5) is working well, when data transfer is ongoing. However, modifications may be needed for the starting phase, when the path via SeNB has not yet been used and thus L_S=0 and TH_S="Initial_Throughput". In such a situation (5) would give a negative value.

For the starting phase (i.e. the PDUs counted within L_S have not yet been sent to the UE) an estimate for the time which a PDU needs to reach the UE via SeNB can be calculated by $$X2\_\text{latency}+(L\_S+\text{PDU-size})/TH\_S \qquad (6)$$

Taking into account (6) the time which a PDU needs to reach the UE via SeNB (or more precisely the time tS1−tS0) can be estimated by the MeNB in the following way. Define $$T\_SeNB=X2\_\text{latency}+(L\_S+\text{PDU-size})/TH\_S, \text{ if the data transfer is in the starting phase} \qquad (7)$$

$$T\_SeNB=\max[(L\_S+\text{PDU-size})/TH\_S-T\_\text{ack\_avg}, X2\_\text{latency}+(\text{PDU-size}/TH\_S)], \text{ if the data transfer is not in the starting phase} \qquad (8)$$

There are various ways how to define the starting phase. In the simplest case the length of the starting phase is set to 0, this means (7) is never used. As an example of an alternatively, one can start a timer T_starting_phase when the variable L_S is incremented from 0 to a value >0 and define "data transfer is in the starting phase" if and only if T_starting_phase<=X2_latency.

Taking into account (2), (7) and (8) one can now define the decision criterion: A PDU should be routed via SeNB if and only if $$T\_SeNB < T\_MeNB \quad (9)$$

One can use the "Initial_Throughput" used in the definition of TH_S to tune the allowed delay, before the path via SeNB is taken into use. Optimal values for "Inital_Throughput" depend on the definition of the starting phase. For example, for a starting phase of length 0, an X2-delay of 5 ms, a PDU size of 1300 bytes and a Minimum_Throughput of 1 Mb/s, the path via SeNB is used for the first time when a PDU would need via MeNB more than X2_latency+(PDU-size/TH_S)=15,4 ms. For a Minimuim_Throughput of 500 kbit/s it would be used for the first time, when a PDU would need via MeNB more than 25,8 ms. One alternative for setting the "Initial_Throughput" value is to base it at least partially on UE's SeNB link quality, which can be known at MeNB based on UE's measurement reports such as the Reference Signal Received Quality (RSRQ), so that better RSRQ link quality translates into higher "Initial_Throughput".

Figure 7:
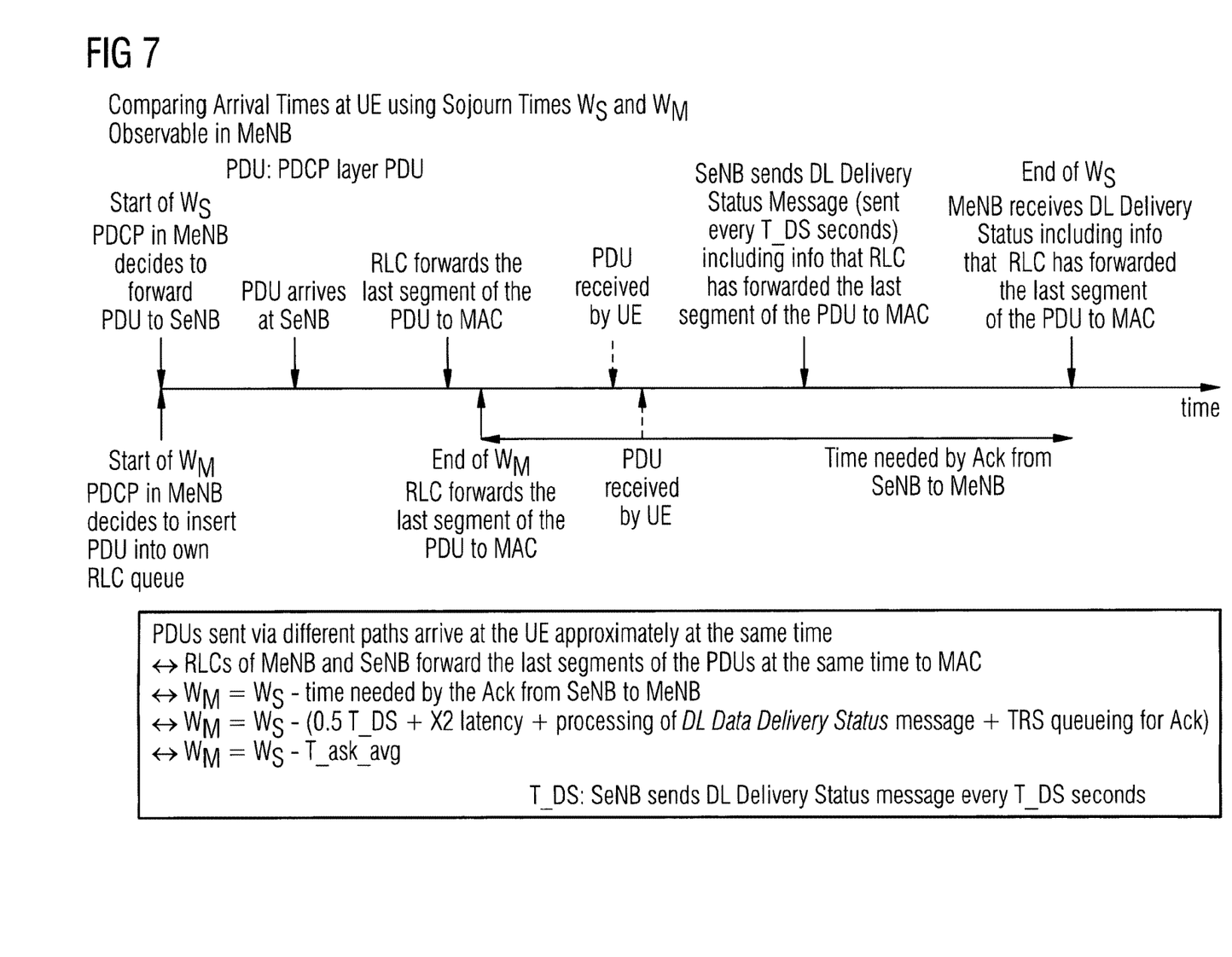
FIG. 7 is a diagram illustrating comparing arrival times at UE using sojourn times $W_S$ and $W_M$ observable in MeNB.

FIG. 7 illustrates comparison arrival times at a UE using sojourn times $W_S$ and $W_M$ observable in MeNB. For the system for calculating the sojourn time Ws, a segment of a PDCP layer PDU (in short PDU) enters the "system", when the MeNB decides to forward the PDU to the SeNB. A PDU leaves the system, when a DL Data Delivery Status message (or ack message) arrives at the MeNB indicating that the PDCP PDU (or a PDCP PDU with higher sequence number) has been successfully delivered in sequence to the UE.. $L_S$ is the sum of PDU sizes of the "PDUs in the system" ("data in flight"). $Th_S$, mean departure rate (throughput). For the system for Calculating the sojourn time $W_M$, a PDU enters the "system" when it is inserted into the RLC queue in the MeNB. It leaves the system when RLC forwards the last segment of the PDU or the last segment of a PDU with higher PDCP sequence number to MAC. $L_M$ is the sum of PDU sizes of the "PDUs in the system" ("data in flight"). $Th_M$ mean departure rate (throughput).

(9) stated a different way may have a criterion for PDCP PDU Data Routing (Split between MeNb and SeNB) which may include:

Path via MeNB faster than path via SeNB, if $$W_M < W_S - T\_ack\_avg \quad (10)$$

where T_ack_avg as defined above.

According to Little's Law $W_M = L_M / Th_M$ and $W_S = L_S / Th_S$.

It follows that (10) is equivalent with $$L_M / Th_M < L_S / Th_S - T\_ack\_avg \quad (11)$$

The SeNB throughput estimate $Th_S$ can be calculated in the MeNB for example as Sum of PDU sizes of PDUs passed to MAC/Sending Period (i.e. $T\_DS$)

The MeNB throughput estimate $Th_M$ can be calculated in an analogous way, alternatively for example a value provided directly from the scheduler can be used.

Late Forwarding of PDUs

The PDCP layer of the MeNB should forward SDUs to one of the two available paths as late as possible in order to keep the amount of PDUs between the splitting point in the MeNB and the reordering function in the UE small. This helps to avoid the following problems:

i. If a lot of data is stored in the SeNB and the available capacity at the air interface is suddenly decreasing high reordering delays will occur in the UE. For example, the available capacity at the air interface may suddenly decrease due to changing radio conditions.

ii. If queues between PDCP layer routing function in the MeNB and reordering function in the UE (this means after adding the PDCP sequence number) overflow and PDUs are lost, the reordering function in the UE will stop forwarding PDUs to the next layer until the reordering timer expires. This interruption may take several hundreds of milliseconds.

iii. The Active Queue Management (AQM) of an eNB may discard packets in order to trigger TCP congestion control. Due to the reordering problem described under ii) AQM should discard packets only from the SDU queue and not from the RLC queues in MeNB or SeNB (see FIG. 4). If there are a lot of packets waiting in the RLC queues then a packet discard from the SDU queue will be noted by the TCP source only after a long delay.

On the other hand there is also a risk that SDUs are forwarded too late. It should not happen that SDUs are queued in the MeNB while the RLC queue in the SeNB runs empty and available capacity at the air interface of the SeNB is not used.

The proposed algorithm removes an SDU from the PDCP queue, only if the expected delay to the UE is below a given "target delay", such as 50 ms for example. Together with inequality (9) this constraint leads to the following algorithm.

PDCP Routing Algorithm

Step 1: Use inequality (9) in order to decide whether the SDU at the head of the PDCP layer queue should be sent via SeNB or via MeNB.

Step 2: Check whether the estimated delay to the UE for the faster path is smaller or equal to the target delay (e.g. using the estimates (2), respectively (7 or 8)).

Step 3: If the check under Step 2 gives a positive result, then process the SDU and forward the resulting PDU towards the faster path. Otherwise keep the SDU in the PDCP layer queue.

Algorithm Using Feedback from SeNB

Features as described herein may use the delay estimates for both MeNB and SeNB, which take into account the X2 delay (for SeNB), and the amount of data that is already in the queue (i.e. previous packets that went to MeNB/SeNB). As a result, if a large chunk of PDUs is routed via SeNB, those should typically not be consecutive. For example, the PDUs routed via SeNB could be every second packet, or 2 out of 3 so that the amount of reordering needed at UE PDCP is reduced. In the end, PDCP reordering no longer has a big effect, because there is a higher probability that the PDUs come in order via the MeNB and SeNB paths.

One way to implement this is that SeNB sends to MeNB the following information for each UE it is serving and that is dual connected to MeNB (such as periodically for example)

1) Queuing delay, denoted here as DQ_SeNB: How long it is estimated to take to transmit the pending data at the SeNB
2) Estimated SeNB throughput, denoted as TP_SeNB (e.g. past throughput, or for new data e.g. in the next ~T ms)

Additionally it is assumed that MeNB knows (can estimate) the X2 delay, denoted here as D_X2. This could be done outside or separately from the flow control.

Figure 5:
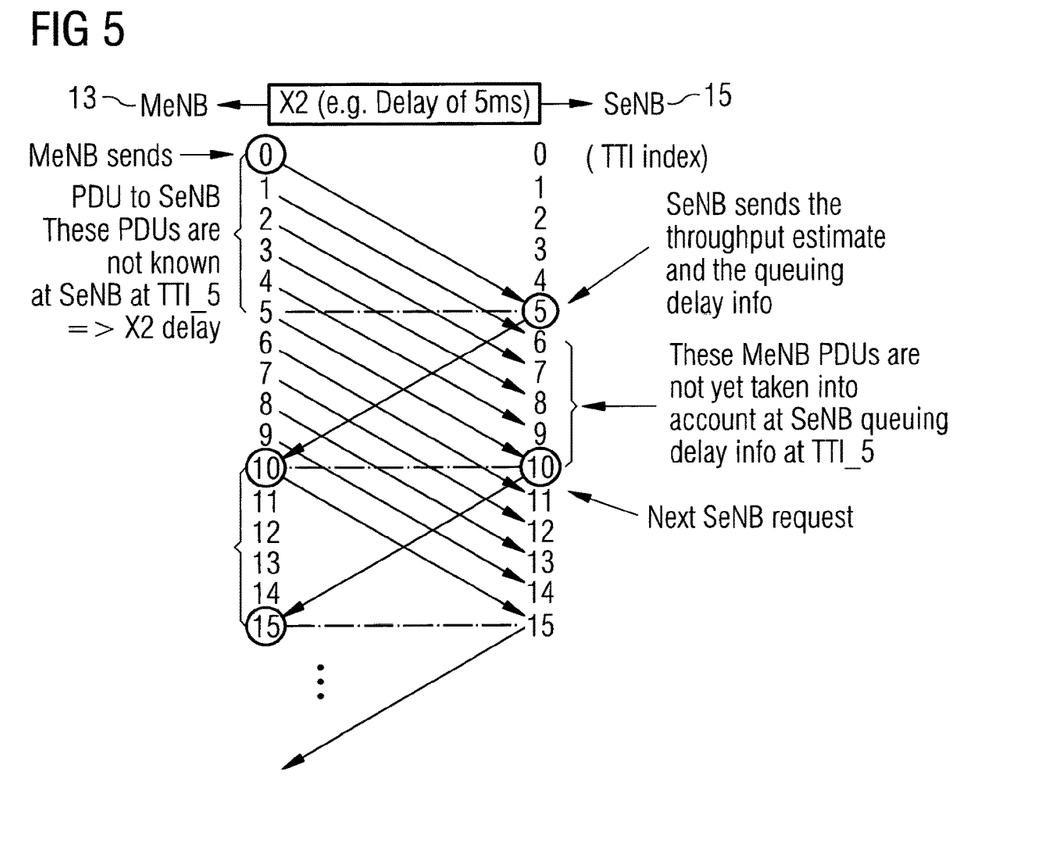
FIG. 5 is an example diagram illustrating delay for the case of taking into account the data that was already sent to SeNB, but is not reflected in the received DQ_SeNB

In this alternative embodiment, the flow control on the MeNB side would run with the following algorithm for example at regular intervals (e.g. once per millisecond or subframe), or when there is a data request from SeNB, or when there is/arrives data in the PDCP buffer and it is to be determined where it is routed (via MeNB or via SeNB)
:
  if (Received updated throughput estimate & delay information from SeNB)
    Store: TP_SeNB
    Store: DQ_SeNB=max(DQ_SeNB−D_X2, 0)//D_X2 is the X2 delay (time elapsed since SeNB sent this info)
    //Take into account the data that was already sent to SeNB, but is not reflected
    //in the received DQ_SeNB, i.e. during last 2*D_X2
    Update: DQ_SeNB+=PDUs_total/TP_SeNB
  else
    DQ_SeNB=DQ_SeNB−T//Update the elapsed time, where T is the time since the last run of the algorithm for the UE (for example 1 ms)
  //Read updated throughput & delay information from MeNB
  Update: TP_MeNB
  Update: DQ_MeNB
  T_Buffering_SeNB=4*D_X2 //such as Target buffering time in SeNB for example
  for each PDU (until we have scheduled the transmissions for the next T_Buffering)
    //Estimate the time it takes to receive this through MeNB and SeNB respectively
    T_MeNB=DQ_MeNB+PDU_size/TP_MeNB
    T_SeNB=max(DQ_SeNB, D_X2)+PDU_Size/TP_SeNB//There is at least X2 delay
    if T_MeNB<T_SeNB
      Push the PDU to MeNB
      Update DQ_MeNB+=PDU_size/TP_MeNB
    else
      Push the PDU to SeNB
      Update DQ_SeNB+=PDU_size/TP_SeNB The way the delay impacts the knowledge on the data availability on the MeNB side, it is illustrated in 5. FIG. 5 is a delay diagram for the case of taking into account the data that was already sent to SeNB, but is not reflected in the received DQ_SeNB, i.e. during last 2*D_X2.

One other alternative implementation of the algorithm would work with:

Sending throughput estimates of SeNB to MeNB over X2 interface
  Periodicity could be configurable, or this information is sent together with PDCP status reports (such as a part of Downlink Data Delivery Status procedure, or other signalling between SeNB and MeNB).
  In an alternative embodiment the UE throughput on SeNB could be also estimated based on MeNB observing the received SeNB indications that the PDUs were successfully delivered to UE (i.e. the throughput at PDCP level).

SeNB queuing delay may be more difficult to send over X2.
  If the SeNB can send the queuing delay information to MeNB, the SeNB can estimate the queuing delay based on dividing the amount of pending data for the UE in SeNB with the estimate UE throughput. The pending data could be taken from RLC level (data that is not yet acknowledged in RLC status report) or MAC level (HARQ transmission still pending). The former option is more accurate, but slower. The latter alternative is faster (as HARQ feedback is fast), but may suffer from occasional errors due to NACK->ACK misinterpretation.

MeNB could estimate the SeNB queuing delay based on: a) SeNB request for data e.g. as part of Downlink Data Delivery Status procedure indicating desired buffer size for UE or E-RAB. (E.g. a large buffer size request could indicate a low level of data in SeNB buffer) and b) Estimate the queuing delay DQ_SeNB=SeNB_T_buffering−SeNB_data_request/SeNB_throughput_estimate, where SeNB_T_buffering is the target buffering time at SeNB or target delay (this could be for example configured by MeNB or negotiated between MeNB and SeNB earlier), SeNB⁺ data_request is the size of desired buffer size indicated by the SeNB, SeNB_throughput_estimate is the SeNB throughput for the UE which could be e.g. signalled from SeNB to MeNB or estimated by MeNB from PDCP status reports. See FIG. 6.

In an alternative embodiment the SeNB queuing delay could be estimated also based on MeNB observing the difference between 1) PDU was routed from MeNB to SeNB, and 2) MeNB receives from SeNB an indication that the PDU was successfully delivered to UE. The estimated time it takes to receive the acknowledgement/message from UE->SeNB->MeNB could be subtracted from this estimate (this includes X2 delay and UL scheduling delay, as well as possibly some processing times).

In addition, it is assumed that MeNB knows (can estimate) the X2 delays.

Figure 6:
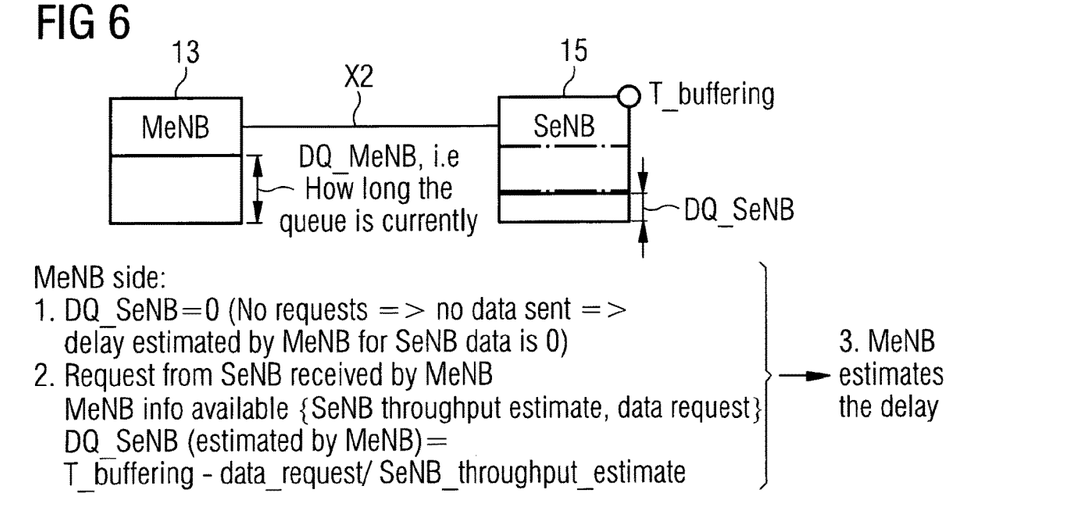
FIG. 6 is an example diagram illustrating A method for estimating the SeNB queuing delay on the MeNB side.

FIG. 6 illustrates a method for estimating the SeNB queuing delay on the MeNB side. MeNB configures the target buffering time of the SeNB T_buffering, SeNB send the data request to MeNB, MeNB estimates the queuing delay as DQ_SeNB=T_buffering−data_request_size/SeNB_throughput_estimate. The assumption here is that the SeNB requests data until the expected/estimated delay for new data is T_buffering. I.e. the SeNB targets to have for the UE such amount of data in the buffer that the time taken to serve all of it is equal to T_buffering.

Features as described above may be used to minimize reordering delays in the UE and the Round Trip Time for TCP, and optimize the usage of the available bandwidth on both paths. Simulation for the Little's Law algorithm described above have shown that Dual Connectivity with this algorithm provides similar performance as Intra eNB Carrier Aggregation. Simulation results have also confirmed that the SeNB data request algorithm described above avoids unnecessary reordering and, thus, gives superior performance compared to responding to SeNB data requests without comparing the delay through SeNB versus delay through MeNB.

The Little's Law algorithm described above may take into account congestion in the transport function of the MeNB. For example, this may be caused by high processing load for Internet Protocol Security (IPSec). In case of transport congestion inside the MeNB, the algorithm will notice growing delays and automatically reduce the transport load by reducing the traffic forwarded to the SeNB. In this way complex MeNB internal overload protection mechanisms like backpressure from Transport to U-Plane can be avoided.

The algorithm takes into account congestion in the transport network (in the same way as MeNB internal congestion is taken into account). Thus, very expensive over-dimensioning of the X2 links between MeNB and SeNB can be avoided which would be required by other algorithms.

For the SeNB data request algorithm described above, the X2 delay (if highly varying) may need to be estimated outside the algorithm. For this purpose the MeNB could perform this estimation (it has other uses as well) for example, or DC messaging could include time stamps which would be also useful for discarding packets at SeNB for example. Rough estimates could be also made based on network topology.

Figure 8:
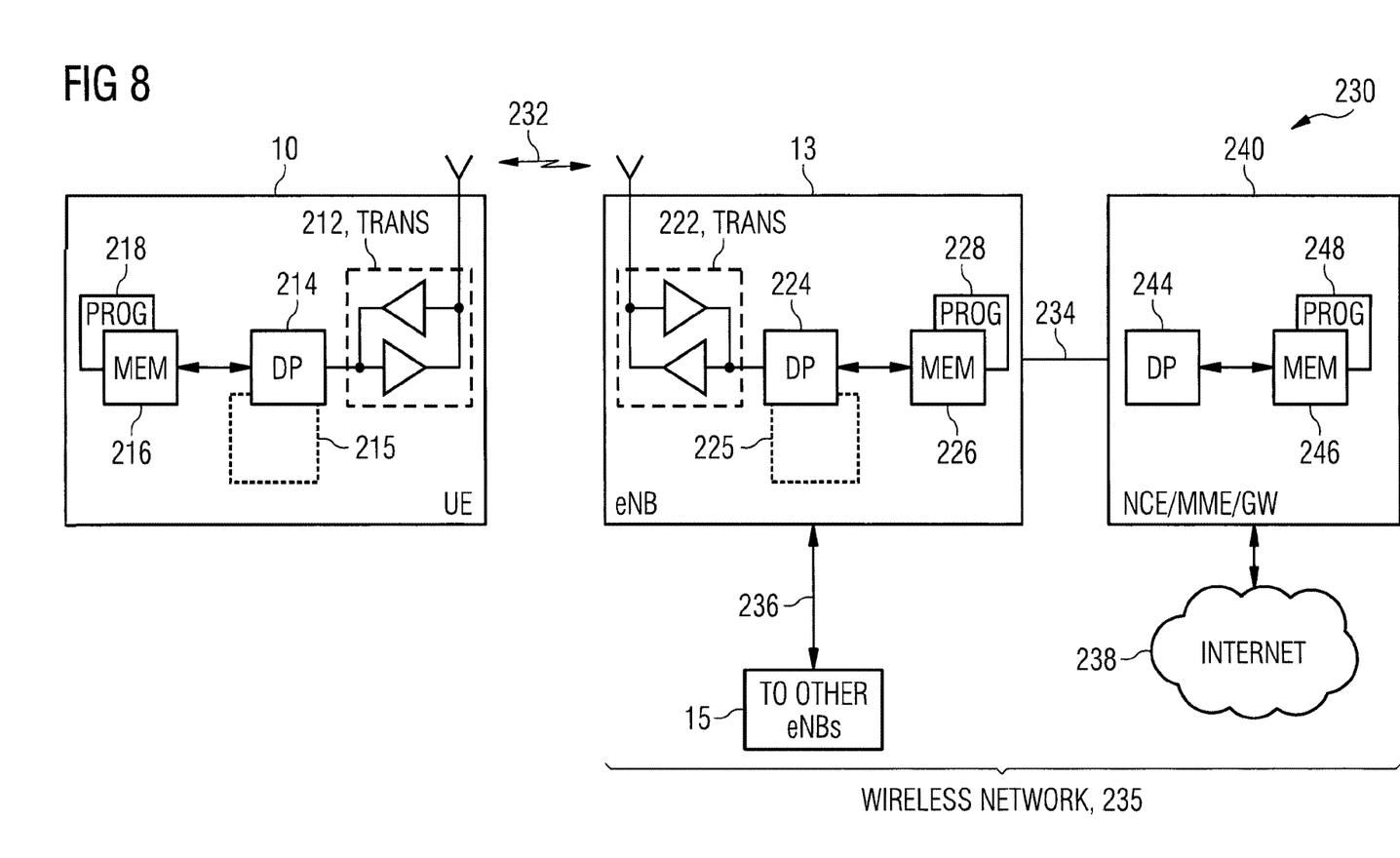
FIG. 8 is a diagram illustrating some components of the wireless system shown in FIGS. 1 and 2.

Referring also to FIG. 8, in the wireless system 230 a wireless network 235 is adapted for communication over a wireless link 232 with an apparatus, such as a mobile communication device which may be referred to as a UE 10, via a network access node, such as a Node B (base station), and more specifically an eNB 13. The network 235 may include a network control element (NCE) 240 that may include MME/S-GW functionality, and which provides connectivity with a network, such as a telephone network and/or a data communications network (e.g., the internet 238).

The UE 10 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 13 via one or more antennas.

The eNB 13 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 10 via one or more antennas. The eNB 13 is coupled via a data/control path 234 to the NCE 240. The path 234 may be implemented as an interface. The eNB 13 may also be coupled to another eNB via data/control path 236, which may be implemented as an interface.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UE 10; by the DP 224 of the eNB 13; and/or by the DP 244 of the NCE 240, or by hardware, or by a combination of software and hardware (and firmware). Base station 15 may have the same type of components as the base station 13.

For the purposes of describing various exemplary embodiments in accordance with this invention the UE 10 and the eNB 13 may also include dedicated processors, for example RRC module 215 and a corresponding RRC module 225. RRC module 215 and RRC module 225 may be constructed so as to operate in accordance with various exemplary embodiments in accordance with this invention.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

According to the 3GPP specification the SeNB should request data according to a "desired buffer size" from the MeNB. The MeNB may send as much data to the SeNB as requested. "Split Data Radio bearers" or simply "split bearers" are used in order to increase the DL throughput of individual bearers compared to bearers not using Dual Connectivity. The PDCP layer routing function in the MeNB has the task to decide whether an arriving downlink SDU of a split bearer shall be forwarded to the local RLC layer, or whether it shall be forwarded via X2-U interface to the SeNB. This means, the routing function splits the arriving data stream into two sub-streams using the two different paths, the direct path and the path via the SeNB.

Features as described herein deal with the question of how to optimally split the arriving data stream. If the splitting is done in a sub-optimal way the throughput of the split bearer may be worse than without using Dual Connectivity.

Consider for example a conventional application using TCP. Assume that the capacity of the path via the SeNB is 1 Mb/s and that the capacity of the path via the MeNB is 10 Mb/s and that the DL data stream is splitted according to a ratio 50:50. Further assume for simplicity that there is no packet loss. The reordering function in the UE will deliver data to the TCP layer at a rate of 2 Mb/s. TCP will send acknowledgements for the DL data to the TCP source at a rate of 2 Mb/s. After slow start and filling the congestion window the TCP source will react with adjusting the sending rate to 2 Mb/s. This means the capacity of the path via MeNB will not be fully used. Without activating Dual Connectivity the TCP source would send at 10 Mb/s, instead of 2 Mbit/s.

It has to be noted that the throughput of the path via the SeNB may be determined by a bottleneck outside the SeNB. The bottleneck can, for example, be in the Transport SW of the MeNB feeding the X2 interface. This may happen in particular if IPSec is used on the X2 interface and a lot of CPU power is needed for ciphering packets sent via X2. A bottleneck may also occur in a router in the path between MeNB and SeNB. It is important that the splitting algorithm running in the PDCP layer of the MeNB takes into account such potential bottlenecks. Otherwise problems as described in the above example may occur.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

Figure 9:
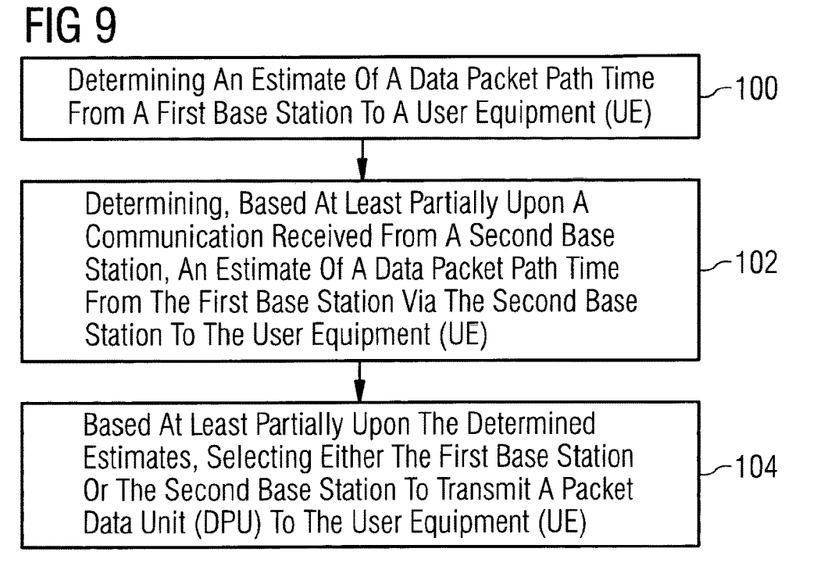
FIG. 9 is a diagram illustrating an example method.

Referring also to FIG. 9, an example method may comprise, such as at MeNB, determining an estimate of a data packet path time from a first base station to a user equipment (UE) as illustrated by block 100; determining, based at least partially upon a communication received from a second base station, an estimate of a data packet path time from the first base station via the second base station to the user equipment (UE) as illustrated by block 102; and based at least partially upon the determined estimates, selecting either the first base station or the second base station to transmit a packet data unit (PDU) to the user equipment (UE) as illustrated by block 104.

Figure 10:
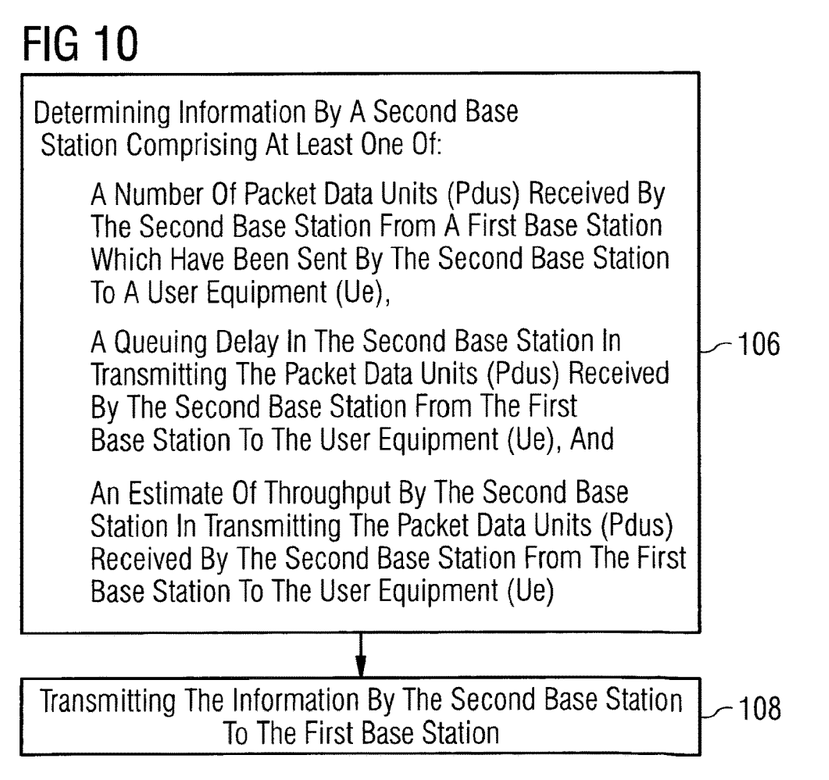
FIG. 10 is a diagram illustrating an example method.

Referring also to FIG. 10, an example method may comprise, such as at SeNB, as illustrated by block 106 determining information by a second base station comprising at least one of:
  a number of packet data units (PDUs) received by the second base station from a first base station which have been sent by the second base station to a user equipment (UE),
  a queuing delay in the second base station in transmitting the packet data units (PDUs) received by the second base station from the first base station to the user equipment (UE), and
  an estimate of throughput by the second base station in transmitting the packet data units (PDUs) received by the second base station from the first base station to the user equipment (UE); and
transmitting the information by the second base station to the first base station as illustrated by block 108.

Fields in DL DATA DELIVERY STATUS message (or ack message) sent from SeNB to MeNB may be used. The highest successfully delivered PDCP Sequence Number may indicate the PDCP PDU with the highest sequence number which has been successfully delivered to the UE. Copies of PDCP PDUs may be stored in MeNB for handover until this message tells, that they can be discarded. The desired buffer size for the E-RAB may be used to indicate the maximum number of bytes which can be accepted by the SeNB: Calculated as "available buffer space–margin". Desired buffer size for the UE may indicate the PDCP PDU with the highest X2-U sequence number which has been passed to MAC layer for transmission (i.e. the RLC layer has passed the last segment of the PDU to the MAC layer). All other fields may be used as described in the standard.

An Algorithm for Data Splitting Taking into Account Congestion on X2 and in eNB may be provides such as the example given below.
  Initialize $Th_S$=Min_$Th_S$ /* default value for min throughput of SeNB=1 Mb/s */;
    $L_M$=$L_S$=0/* data in flight */ ;
    Target_delay/* default value 50 ms, backhaul queues in X2 path should be able to buffer data for Target_delay */
  Do at the start of a TTI
    $Th_M$=$R_{DL, bearer}$/*expected throughput of this bearer as provided by scheduler >0 */
  When one or more segments of PDUs are passed from the RLC queue of MeNB to MAC
    DO for each PDU for which the last segment has been passed to MAC
      $L_M$=$L_M$−PDUsize;
      Set trigger to check the SDU at the head of the PDCP queue
  On arrival of a DL DATA DELIVERY STATUS message/* Periodically sent by SeNB, every T_DS ms/
    Calculate Departures_S/* Sum of PDU sizes of all PDUs with: X2-U sequence number greater than "Highest X2-U sequence number passed to MAC layer" of last message and less or equal to
    "Highest X2-U sequence number passed to MAC layer" of this message */
    $L_S$=$L_S$−Departures_S;
    Calculate Ack_S/* Departure_S minus PDU sizes of lost PDUs reported in the DL DATA DELIVERY message */
    $Th_S$=max((1/T)·(Ack_S/T_DS)+(1−1/T)·$Th_S$, Min_$Th_S$)/* T=2·X2_latency */
      Set the trigger to check the SDU at the head of the PDCP queue
  On receiving a trigger to check the SDU at the head of the PDCP queue Calculate PDUsize;
    IF (LM+PDUsize)/$Th_M$<max (PDUsize/ThS+X2_latency, (LS+PDUsize)/ThS−T_ack_avg)/* path via MeNB faster than via SeNB */
    THEN IF (LM+PDUsize)/ThM<Target_delay
      THEN cipher SDU/add PDCP sequence number;
        insert PDU into RLC queue for MeNB; LM=LM+PDUsize;
        Set the trigger to check the SDU at the head of the PDCP queue
      ELSE keep SDU in PDCP queue
    ELSE IF max (PDUsize/ThS+X2_latency, (LS+PDUsize)/ThS−T_ack_avg)<Target_delay
      AND (LS+PDUsize <Desired buffer size for the E-RAB)
    THEN cipher SDU/add PDCP sequence number;
      forward PDU via X2; LS=LS+PDUsize,
      Set the trigger to check the SDU at the head of the PDCP queue ELSE keep SDU in PDCP queue In one type of example a method comprises determining an estimate of a data packet path time from a first base station to a user equipment (UE); determining, based at least partially upon a communication received from a second base station, an estimate of a data packet path time from the first base station via the second base station to the user equipment (UE); and based at least partially upon the determined estimates, selecting either the first base station or the second base station to transmit a packet data unit (PDU) to the user equipment (UE).

In one example, when the estimated data packet path time via a selected one of the base stations is below a target delay, the method may include forwarding the PDU to the selected base station.

An example embodiment may be provided in an apparatus comprising at least one processor; and at least one non-transitory memory including computer program code, the at least one memory and the computer program code configured to, with the at least one processor, cause the apparatus to: determine an estimate of a data packet path time from a first base station to a user equipment (UE); determine, based at least partially upon a communication received from a second base station, an estimate of a data packet path time from the first base station via the second base station to the user equipment (UE); and based at least partially upon the determined estimates, select either the first base station or the second base station to transmit a packet data unit (PDU) to the user equipment (UE).

An example embodiment may be provided in an apparatus comprising a non-transitory program storage device, such as 226 shown in FIG. 8 for example, readable by a machine, tangibly embodying a program of instructions executable by the machine for performing operations, the operations comprising: determining an estimate of a data packet path time from a first base station to a user equipment (UE); determining, based at least partially upon a communication received from a second base station, an estimate of a data packet path time from the first base station via the second base station to the user equipment (UE); and based at least partially upon the determined estimates, selecting either the first base station or the second base station to transmit a packet data unit (PDU) to the user equipment (UE).

An example embodiment may be provided in an apparatus comprising means for determining an estimate of a data packet path time from a first base station to a user equipment (UE); means for determining, based at least partially upon a communication received from a second base station, an estimate of a data packet path time from the first base station via the second base station to the user equipment (UE); and means for selecting, based at least partially upon the determined estimates, either the first base station or the second base station to transmit a packet data unit (PDU) to the user equipment (UE).

The apparatus may further comprise means for delaying forwarding of the PDU by the first base station to a path to the user equipment in order to keep a quantity of PDUs between a splitting point in the first base station and a reordering function in the user equipment low.

An example method may comprise determining information by a second base station comprising at least one of: a number of packet data units (PDUs) received by the second base station from a first base station which have been sent by the second base station to a user equipment (UE), a queuing delay in the second base station in transmitting the packet data units (PDUs) received by the second base station from the first base station to the user equipment (UE), and an estimate of throughput by the second base station in transmitting the packet data units (PDUs) received by the second base station from the first base station to the user equipment (UE); and transmitting the information by the second base station to the first base station.

An example embodiment may be provided in an apparatus comprising at least one processor; and at least one non-transitory memory including computer program code, the at least one memory and the computer program code configured to, with the at least one processor, cause the apparatus to: determine information by the apparatus, where the apparatus comprises a second base station, comprising at least one of: a number of packet data units (PDUs) received by the second base station from a first base station which have been sent by the second base station to a user equipment (UE), a queuing delay in the second base station in transmitting the packet data units (PDUs) received by the second base station from the first base station to the user equipment (UE), and an estimate of throughput by the second base station in transmitting the packet data units (PDUs) received by the second base station from the first base station to the user equipment (UE); and transmit the information by the second base station to the first base station.

An example embodiment may be provided in an apparatus comprising a non-transitory program storage device readable by a machine, tangibly embodying a program of instructions executable by the machine for performing operations, the operations comprising: determining information by a second base station comprising at least one of: a number of packet data units (PDUs) received by the second base station from a first base station which have been sent by the second base station to a user equipment (UE), a queuing delay in the second base station in transmitting the packet data units (PDUs) received by the second base station from the first base station to the user equipment (UE), and an estimate of throughput by the second base station in transmitting the packet data units (PDUs) received by the second base station from the first base station to the user equipment (UE); and transmitting the information by the second base station to the first base station.

An example embodiment may be provided in an apparatus comprising means for determining information by a second base station comprising at least one of: a number of packet data units (PDUs) received by the second base station from a first base station which have been sent by the second base station to a user equipment (UE), a queuing delay in the second base station in transmitting the packet data units (PDUs) received by the second base station from the first base station to the user equipment (UE), and an estimate of throughput by the second base station in transmitting the packet data units (PDUs) received by the second base station from the first base station to the user equipment (UE); and means for transmitting the information by the second base station to the first base station.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. If desired, the different functions discussed herein may be performed in a different order and/or concurrently with each other.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims. Accordingly, the description is intended to embrace all such alternatives, modifications and variances which fall within the scope of the appended claims.

What is claimed is:

1. A method comprising:
    determining a first estimate of a path time for sending a packet data unit via a first path from a first base station to a user equipment;
    determining, based at least partially upon a communication received from the second base station, a second estimate of a path time for sending the packet data unit via a second path from the first base station via the second base station to the user equipment, wherein the second estimate is based in part on other packet data units considered to be in transit between the first and second base stations and not yet acknowledged by the second base station;
    based at least partially upon the determined first and second estimates, selecting for at least one transmission by the first base station either the first path or the second path based on whichever path is determined to be fastest; and
    transmitting, for the at least one transmission and based on the selecting, the packet data unit by the first base station either via the first path toward the user equipment or via the second path toward the second base station for the second base station to transmit the packet data unit to the user equipment.

2. The method according to claim 1, wherein, in response to the first or second estimated path time via a selected and corresponding one of the first or second paths and corresponding first or second base stations being below a target delay, the selecting selects the selected path and corresponding base station for the corresponding transmitting.

3. The method of claim 2, wherein the transmitting is performed only in response to the selected one of the first or second paths having a corresponding first or second estimated path time that is below the target delay.

4. The method according to claim 1, wherein selecting for at least one transmission by the first base station is done early enough to avoid a radio link control queue of the second base station from running empty.

5. The method according to claim 1, wherein each estimate of a path time for sending the packet data unit via the corresponding one of the first or second paths is determined as a ratio based on a number of packet data units in the first base station that are considered to be in transit for the corresponding first or second path and throughput of the in transit packet data units for the corresponding first or second path.

6. The method according to claim 1, wherein each estimate of a path time for sending the packet data unit via the corresponding one of the first or second paths is dependent on a ratio between a total size and a throughput, wherein the total size is of both a size of a number of packet data units in the first base station that are considered to be in transit for the corresponding first or second path and a size of the packet data unit to be sent to the user equipment via the corresponding one of the first or second paths, and wherein the throughput is throughput of the in transit packet data units for the corresponding first or second path.

7. The method according to claim 1, wherein the second estimate of the path time via the second path from the first base station via second base station to the user equipment is determined based on recent throughput of other packet data units transmitted via the second base station to the user equipment.

8. The method according to claim 1, wherein the second estimate of the path time via the second path from the first base station via the second base station to the user equipment is dependent on feedback sent from the second base station to the first base station.

9. The method according to claim 8, wherein the feedback includes indication of at least one of a queuing delay of the second base station, an estimate of throughput of a part of the second path between the second base station toward the user equipment, or an amount of data sent by the second base station toward the user equipment.

10. The method according to claim 1, further comprising delaying the transmitting of the packet data unit by the first base station via one of the first or second paths to the user equipment in order to keep a number of packet data units between a splitting point in the first base station and a reordering function in the user equipment low.

11. The method of claim 1, wherein the first estimate is based in part on other packet data units considered to be in transit between the first base station and the user equipment.

12. The method of claim 11, wherein:
    the other packet data units that are considered to be transit between the first base station are first packet data units;
    the first packet data units are considered to be in transit between the first base station and the user equipment based at least on information indicating a decision has been made to send the first packet data units to the user equipment from the first base station but where waiting is being performed for information that the first packet data units have actually been sent to the user equipment;
    the other packet data units that are considered to be in transit between the first and second base stations are second data packet data units; and
    the second packet data units are considered to be in transit between the first and second base stations based at least on information indicating that the second packet data units have been routed to a second base station but have not yet been acknowledged by the second base station.

13. An apparatus comprising:
    at least one processor; and
    at least one non-transitory memory including computer program code, the at least one memory and the computer program code configured to, with the at least one processor, cause the apparatus to:
    determine a first estimate of a path time for sending a packet data unit via a first path from a first base station to a user equipment;
    determine, based at least partially upon a communication received from a second base station, a second estimate of a path time for sending the packet data unit via a second path from the first base station via the second base station to the user equipment, wherein the second estimate is based in part on other packet data units considered to be in transit between the first and second base stations and not yet acknowledged by the second base station;
    based at least partially upon the determined first and second estimates, select for at least one transmission by the first base station either the first path or the second path based on whichever path is determined to be fastest; and
    transmitting, for the at least one transmission and based on the selecting, the packet data unit by the first base station either toward the user equipment or toward the second base station for the second base station to transmit the packet data unit to the user equipment.

14. The apparatus according to claim 13, wherein, in response to the first or second estimated path time via a selected and corresponding one of the first or second paths and corresponding first or second base stations being below a target delay, the selecting selects the selected path and corresponding base station for the corresponding transmitting.

15. The apparatus according to claim 13, wherein selecting for at least one transmission by the first base station is done early enough to avoid a radio link control queue of the second base station from running empty.

16. The apparatus according to claim 13, wherein each estimate of a path time for sending the packet data unit via the corresponding one of the first or second paths is determined as a ratio based on a number of packet data units in the first base station that are considered to be in transit for the corresponding first or second path and throughput of the in transit packet data units for the corresponding first or second path.

17. The apparatus according to claim 13, wherein each estimate of a path time for sending the packet data unit via the corresponding one of the first or second paths is dependent on a ratio between a total size and a throughput, wherein the total size is of both a size of a number of packet data units in the first base station that are considered to be in transit for the corresponding first or second path and a size of the packet data unit to be sent to the user equipment via the corresponding one of the first or second paths, and wherein the throughput is throughput of the in transit packet data units for the corresponding first or second path.

18. The apparatus according to claim 13, wherein the second estimate of the path time via the second path from the first base station via second base station to the user equipment is determined based on recent throughput of other packet data units transmitted via the second base station to the user equipment.

19. The apparatus according to claim 13, wherein the at least one memory and the computer program code configured to, with the at least one processor, cause the apparatus to delay the transmitting of the packet data unit by the first base station to one of the first or second paths to the user equipment in order to keep a number of packet data units between a splitting point in the first base station and a reordering function in the user equipment low.

20. A non-transitory program storage device readable by a machine, tangibly embodying a program of instructions executable by the machine for performing operations, the operations comprising:
   determining a first estimate of a path time for sending a packet data unit via a first path from a first base station to a user equipment;
   determining, based at least partially upon a communication received from a second base station, a second estimate of a path time for sending the packet data unit via a second path from the first base station via the second base station to the user equipment, wherein the second estimate is based in part on other packet data units considered to be in transit between the first and second base stations and not yet acknowledged by the second base station;
   based at least partially upon the determined first and second estimates, selecting for at least one transmission by the first base station either the first path or the second path based on whichever path is determined to be fastest; and
   transmitting, for the at least one transmission and based on the selecting, the packet data unit by the first base station either toward the user equipment or toward the second base station for the second base station to transmit the packet data unit to the user equipment.

* * * * *